March 21, 1950 L. G. JEFFREYS 2,501,390
WINDING AND REELING DEVICE
Filed April 9, 1946

Inventor
Lloyd G. Jeffreys
Attorneys

Patented Mar. 21, 1950

2,501,390

UNITED STATES PATENT OFFICE 2,501,390

WINDING AND REELING DEVICE

Lloyd G. Jeffreys, Meadow, Tex.

Application April 9, 1946, Serial No. 660,757

2 Claims. (Cl. 254—166)

This invention relates to devices for winding and reeling wire and the like.

An object of this invention is to provide a device which is readily attachable to and detachable from a power operated vehicle such as a tractor, and carries means whereby through power derived from the tractor, wire may be conveniently reeled and unreeled as desired.

Another object of the invention is to provide a winding and reeling device which is simple to construct and which is inexpensive and quite effective in operation.

A further object of the invention is to provide a device for winding and reeling wire disposed for a considerable distance over the ground or elevated therefrom, in such a manner as to avoid kinking and snarling the wire, yet performing the operation with convenient speed of takeup.

Other objects and advantages of the invention will become apparent from the following description of a preferred embodiment thereof as illustrated in the accompanying drawing and in which—

Figure 1:
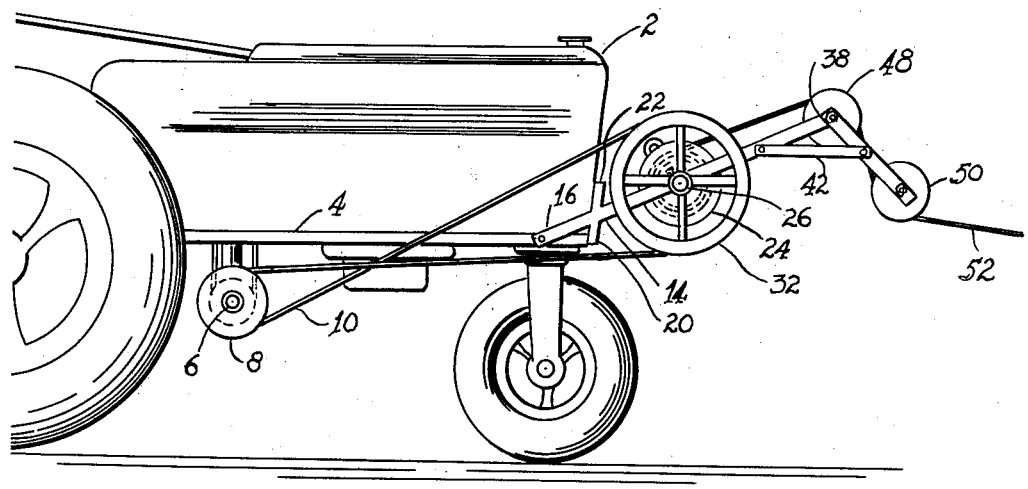
Figure 2:
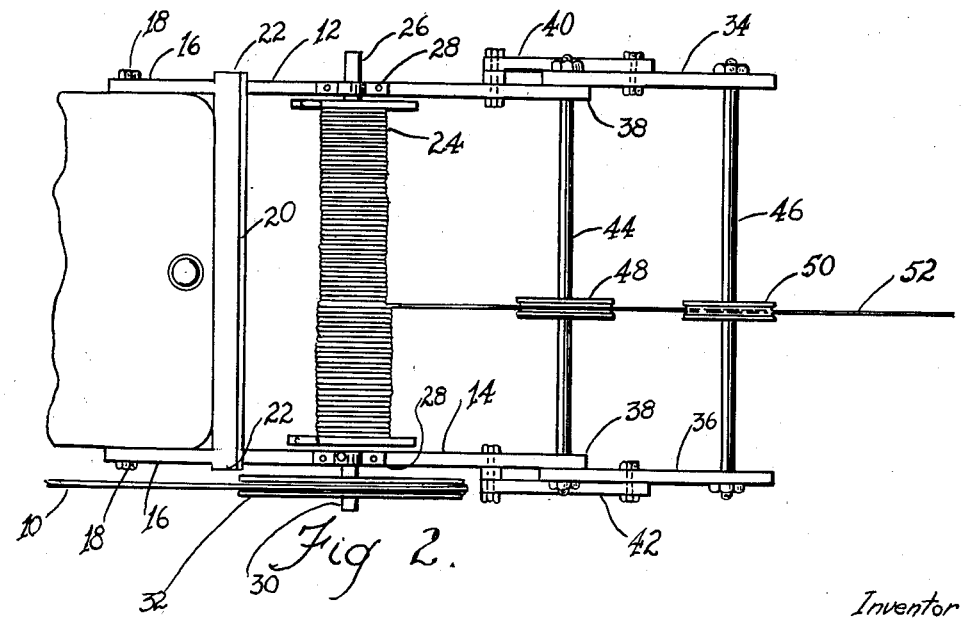

Figure 1 is a side elevation of my improved device installed in position on a tractor, and Figure 2 is an enlarged plan view of the device shown in Figure 1.

As shown, there is a tractor having a chassis frame 4 with a power take-off shaft 6 mounted on the frame and rotatable by power derived from the tractor engine through a clutch in the usual manner. A pulley 8 is secured on the shaft 6 and driven thereby, the pulley having its peripheral groove arranged for the reception of a V belt 10 or other convenient form of power transmitting belt.

There are two side rails 12 and 14 secured at their rearward ends 16 to the tractor chassis frame 4 by means of screws 18. A cross member 20 extends across the front of the tractor with its upright sides 22 welded to the side rails 12 and 14, thus providing a rigid support for the winding device and holding the side rails tilted forwardly upward as shown in Figure 1.

A winding drum 24 is fast on axle shaft 26 which is journaled in bearings 28 carried on side rails 12 and 14, the protruding end 30 of the axle shaft having fast thereon a rotatable pulley wheel 32 grooved for the reception of the belt 10 as shown. Extension rails 34 and 36 are secured to the forward ends 38 of the side rails 12 and 14, with stiffening supports 40 and 42 secured at their ends respectively to the side rails rearwardly of their ends 38 and to an intermediate portion of extension rails 34 and 36, the stiffening supports 40 and 42 being so proportioned that the extension rails 34 and 36 are tilted downward as shown in Figure 1.

Shafts 44 and 46 bridge across and are secured at their ends to the forward ends respectively of side rails 12 and 14, and extension rails 34 and 36 as shown. Guide pulleys 48 and 50 are rotatable on shafts 44 and 46, being also slidable longitudinally of the shafts, the pulleys being grooved for guiding wire 52 being reeled and the like.

In operation, it is only necessary to leave the tractor stationary and run the motor, thus rotating the power take-off pulley 8 and rotating the winding drum 24, at a suitable rate of speed to rewind all the wire 52 onto the drum 24, the wire being guided around the under side of pulley 50 and around the upper side of pulley 48, and thence onto the winding drum. As the wire is being wound, the guide pulleys 48 and 50 slide longitudinally of the shafts 44 and 46, thus guiding the wire smoothly onto the drum so it is wound in uniform layers. To unreel the wire, it is only necessary to tie one end of the wire to a post and to back away with the tractor. The device is easily modified to fit any tractor by merely changing the dimensions of the portions connectable to the tractor.

Although I have described a preferred embodiment of my invention in specific terms it is to be understood that various changes may be made in size, shape, materials and arrangement without departing from the spirit and scope of the invention.

I claim:

1. The combination with a tractor including a chassis having a forward end and a power take-off displaced rearwardly from said forward end, of a frame comprising side rails secured to opposite sides of said chassis and projecting forwardly beyond the forward end of the chassis, a cross member extending between and fixed to said side rails and supportably abutting the forward end of said chassis, a wire winding drum positioned between said side rails immediately in front of said cross member, said drum comprising a shaft rotatably supported on said side rails, a first guide shaft supported on and between the forward ends of said side rails on a level above the axis of said drum shaft, a first guide pulley slidably and rotatably mounted on said first guide shaft, extension rails declining forwardly from the forward ends of said side rails with their elevated rear ends secured to said first guide shaft, diagonal braces fixed to and extending between said side rails and extension rails below the level of said first guide shaft, a second guide shaft supported on and between the depressed forward ends of said extension rails on a level substantially below the level of said first guide shaft, and a second guide pulley rotatably and slidably mounted on said second guide shaft, and drive means extending operatively between said power take-off and said drum shaft.

2. The combination with a tractor including a chassis having a forward end and a power take-off displaced rearwardly from said forward end, of a frame comprising side rails secured to opposite sides of said chassis and projecting forwardly beyond the forward end of the chassis, a cross member extending between and fixed to said side rails and supportably abutting the forward end of said chassis, a wire winding drum positioned between said side rails immediately in front of said cross member, said drum comprising a shaft rotatably supported on said side rails, a first guide shaft supported on and between the forward ends of said side rails on a level above the axis of said drum shaft, a first guide pulley slidably and rotatably mounted on said first guide shaft, extension rails declining forwardly from the forward ends of said side rails with their elevated rear ends secured to said first guide shaft, diagonal braces fixed to and extending between said side rails and extension rails below the level of said first guide shaft, a second guide shaft supported on and between the depressed forward ends of said extension rails on a level substantially below the level of said first guide shaft, and a second guide pulley rotatably and slidably mounted on said second guide shaft, and drive means extending operatively between said power take-off and said drum shaft, said first and second guide pulleys being of substantially the same diameter and arranged to support wire trained rearwardly under said second guide pulley and over said first guide pulley onto said drum in a stretched and uinformly wound condition.

LLOYD G. JEFFREYS.

REFERENCES CITED

The following references are of record in the file of this patent:

UNITED STATES PATENTS

| Number | Name | Date |
|---|---|---|
| 2,307,611 | Webster | Jan. 5, 1943 |

FOREIGN PATENTS

| Number | Country | Date |
|---|---|---|
| 110,297 | Austria | July 25, 1928 |
| 203,674 | Great Britain | Apr. 24, 1924 |
| 414,532 | Great Britain | Aug. 9, 1934 |